US008520784B1

(12) United States Patent
Lackey

(10) Patent No.: US 8,520,784 B1
(45) Date of Patent: Aug. 27, 2013

(54) COHERENT BEAM COMBINING OF INDEPENDENTLY FADED SIGNALS

(75) Inventor: Raymond J. Lackey, Bohemia, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/450,996

(22) Filed: Apr. 19, 2012

(51) Int. Cl.
  *H04B 7/10* (2006.01)
  *H04L 1/02* (2006.01)

(52) U.S. Cl.
  USPC ........... 375/347; 375/284; 375/325; 375/342; 375/343; 375/349

(58) Field of Classification Search
  USPC ................. 375/219–230, 232, 259, 260, 285, 375/295–296, 309, 311–316, 340, 342–346, 375/349–351
  See application file for complete search history.

(56) References Cited

U.S. PATENT DOCUMENTS

| 5,926,503 | A  | * | 7/1999  | Kelton et al. ................. 375/148 |
| 5,940,291 | A  | * | 8/1999  | Dawson et al. ................. 700/28 |
| 6,693,971 | B1 |   | 2/2004  | Kowalski |
| 7,437,139 | B2 |   | 10/2008 | Lo et al. |
| 7,515,895 | B2 |   | 4/2009  | Vorenkamp et al. |
| 7,519,342 | B2 |   | 4/2009  | Ruitenburg et al. |
| 7,809,337 | B2 | * | 10/2010 | Strong ........................... 455/69 |
| 8,032,103 | B2 |   | 10/2011 | Lackey |
| 2007/0217526 | A1 | * | 9/2007 | Park et al. ..................... 375/260 |
| 2010/0135443 | A1 | * | 6/2010 | Lackey ......................... 375/346 |

\* cited by examiner

*Primary Examiner* — Sam K Ahn
*Assistant Examiner* — James M Perez
(74) *Attorney, Agent, or Firm* — Dilworth & Barrese, LLP; Michael J. Musella; Leo G. Lenna

(57) ABSTRACT

An adaptive beam steering control system suitable for multiple element systems is provided for coherently forming a beam and tracking a dynamic scenario of a rapidly fading environment. The adaptive beam steering control system and associated method advantageously provide improved continuous beam steering with a faster response time and higher precision than normally attainable by using the greater slope of the nulling error function to perform the beam steering function. Although reciprocity of nulling and beam steering is normally only true for a single pair of elements, the method of the invention extends the process to larger arrays of elements.

15 Claims, 22 Drawing Sheets

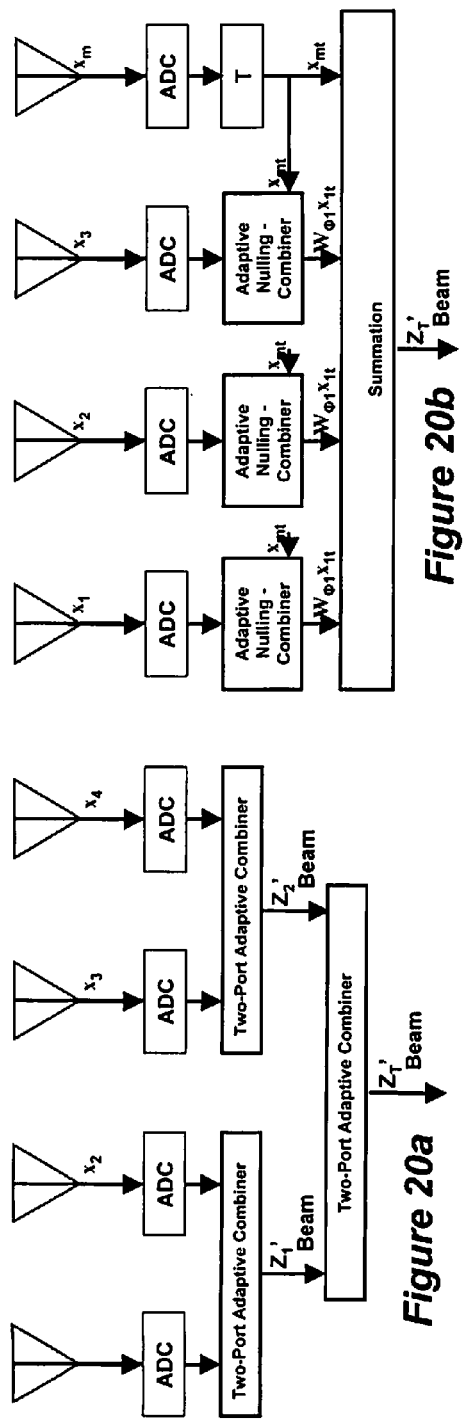
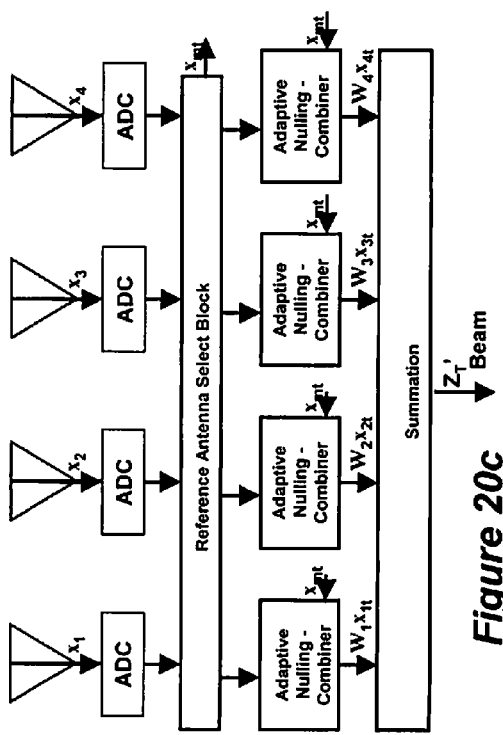
*Figure 20b*
*Figure 20c*
*Figure 20a*

COHERENT BEAM COMBINING OF INDEPENDENTLY FADED SIGNALS

The invention was made with United States Government support under Contract No. N00014-10-D-0162 awarded by the United States Navy. The United States Government has certain rights in this invention.

BACKGROUND OF THE INVENTION

1. Field of the Invention

The invention relates generally to the field of radio communication and, in particular, to a system and method of increasing the range of a data link without increasing transmit antenna size, receive antenna size or transmit power.

2. Description of the Related Art

Multipath fading limits the effective size and thus gain of a receive antenna or phased array. The fading can be time varying in phase modulation, amplitude modulation, and time delay so that fixed combining is not applicable. Data link range in fading conditions are limited by transmit power, transmit antenna gain and receive antenna gain. Transmit power and antenna gains are often limited by the platform limitations.

The receive antenna gain is normally considered to be a function of the size of the antenna or array. If 3 dB additional gain is necessary, the antenna is doubled in size or twice as many array elements are used. In the case of a multipath environment, whether troposphere refraction or signal reflection from a conducting surface, the data link is limited more by the fading of the channel rather than by the actual array gain. Data link performance is thus limited by the fading multipath environment. The multipath causes distortions that differ at each element so that the array no longer sees a plane wave arrival of the desired signal.

A need therefore exists for a communication system and associated method improving detection range without increasing transmit power or transmit antenna size.

SUMMARY OF THE INVENTION

There is provided an adaptive communication system and associated method for coherently combining a number of fading signals on widely spaced phase array antenna (PAA) elements to improve detection range without increasing transmit power or transmit antenna size. The PAAs can be constructed as sub-arrays of a single phased array antenna but the performance in a fading environment exceeds the performance of the full phased array in normal operation. Similarly, a group of smaller dishes comprising the area of a single dish can be combined to perform better than the single antenna dish alone.

According to a method embodiment, a high speed adaptive nulling capability is provided to lock onto and track the desired signal of one path of a number of parallel signal paths. Adaptive weights are then processed to derive beam-forming weights. In one embodiment, only the phase value is extracted from the nulling weight in combination with flipping the arithmetic sign by summing rather than differencing the signals thus combining all elements of the array of elements coherently prior to demodulating the signal.

BRIEF DESCRIPTION OF THE DRAWINGS

These and other objects, features and advantages of the invention will be apparent from a consideration of the following Detailed Description Of The Invention considered in conjunction with the drawing figures in which:

FIG. 12b is a prior art illustration showing an improved architecture from what is shown in FIG. 12a.

FIGS. 20a-c illustrate three different architectures showing how expansion from a two-element system to a four element system could be implemented. FIG. 20a. illustrates a direct expansion with a common building block. FIG. 20b illustrates an expansion using a common auxiliary building block and a different main element building block with all elements synchronized to a single main element. FIG. 20c illustrates a reference antenna selection block that would pick out a strong signal to use for tracking by all auxiliary elements requiring a control signal to the adaptive loop of the selected reference element to switch the input to the integrator as shown in FIG. 17 to facilitate decay to a unit weight.

DETAILED DESCRIPTION OF THE INVENTION

Figure 1:
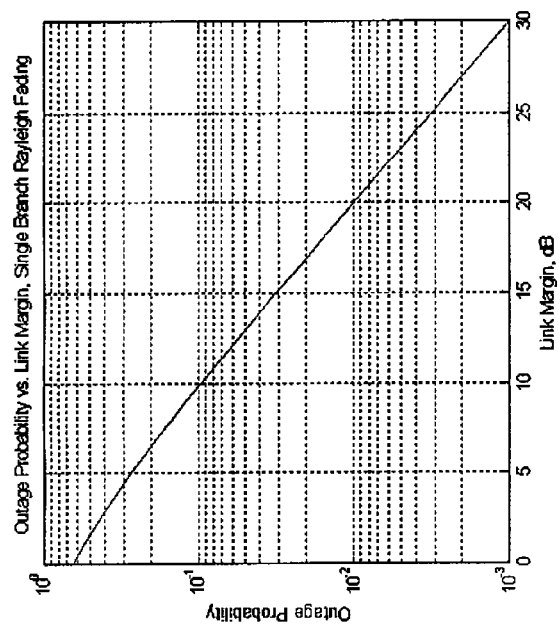
FIG. 1 is a graph of outage probability vs. link margin for a single large array for a data link over water, having a good surface reflectivity, according to the prior art.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Overview

The present disclosure is directed to a special case of adaptive wideband beam-forming, directed to tracking fading channels over a conductive surface such as smooth salt water, in a sparse array referred to herein as pre-demod coherent combining (PDCC). A sparse array is one where array elements are spaced at greater than the carrier wavelength, i.e., lamda ($\lambda$) spacing, giving rise to beam lobing and interspersed nulls at high rates in angular space. As is well known in the art, wideband beam-forming has the complexity of requiring time match in the direction of the desired signal to match propagation as well as accurate phase and amplitude weighting of the elements. The failure to properly match the propagation and channel delays yields a spectral distortion across the bandwidth of interest typically illustrated as a butterfly-wing null centered in the band but just as likely to be skewed to one side or the other. This spectral shaping can have significant impact on the bit error rate (BER) of the demodulation process.

Two methods are disclosed herein to overcome the aforementioned drawback. In a first method, multiple receive arrays are spaced so that each has an independent fading environment and then either combining incoherently after detection. In a second method, multiple receive arrays are spaced so that each has an independent fading environment and then either combining incoherently before detection. The first approach eliminates errors based on instantaneous faded BER which gives weighting to the quality of a vote. The second approach eliminates the occurrence of low signal strength to improve the total BER at detection but has been limited by fading environment dynamics.

In a preferred embodiment, a large receive array is broken into two or more sub-array phased array antennas (PAAs) and then each sub-array is processed to provide significantly improved data link performance than what can otherwise be achieved when the same number of elements are used in a single array. It is assumed that the two or more sub-arrays, i.e., phased array antennas (PAAs) or dish antennas are all steered toward the desired signals so that it is the predominant signal in each channel. In those scenarios where the steering presumption is not valid, and other signals occur in band, it may be necessary to provide additional signal discrimination in the control loops.

According to one aspect, a nulling process is used to track the dynamics of the rapidly changing fading environment due to the nulling error function sensitivity to small changes in phase and then processing the nulling weights to generate beam-steering weights for the same signal inputs.

Operation

Referring now to FIG. 1, there is shown a graph of outage probability vs. link margin for a single large array for a data link over water, having a good surface reflectivity. As is well known in the art, a data link with a fading channel is designed with a link margin to assure that the required data rate is maintained but it is only a statistical probability. The graph shows that a system designed with even a 30 dB link margin still has an outage probability of 0.1%. A system designed with a 20 dB link margin has an outage probability of 1% and a system designed with a 10 dB link margin has an outage probability of 10%. Thus the data link must be designed to accommodate the frequent outages.

Figure 2:
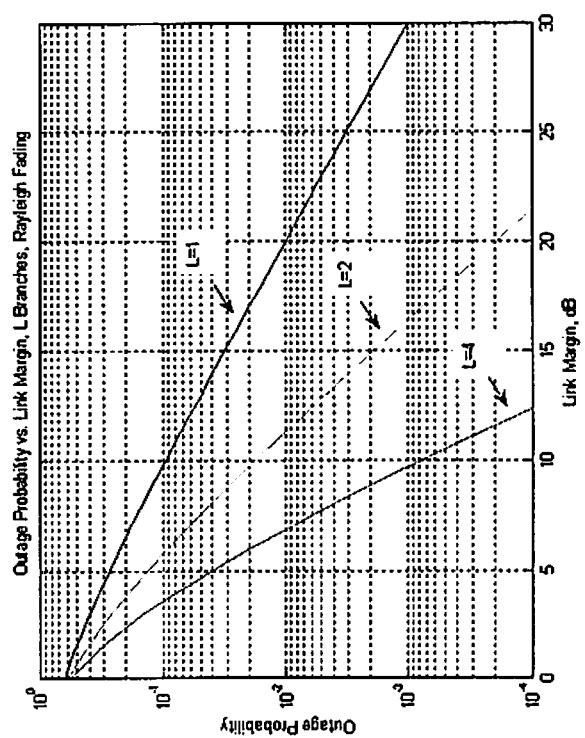
FIG. 2 is a graph of outage probability vs. link margin illustrating how the probability of outage can be improved (reduced) at lower link margins by dividing an array with a fixed number of elements into sub-arrays spaced to provide independent fading channels.

The required link margin, and thus the size of the array, can be greatly reduced by dividing a single large array into a number of sub-arrays spaced to provide independent fading channels. FIG. 2 shows the potential gain from this process. For the case of 0.1% outage, a 9 dB reduction in required link margin is realized by creating two sub arrays and a 12 dB reduction in required link margin is realized by creating four sub arrays. Further sub-divisions create even greater reductions in dB due to sub-array fading but also limit the maximum S/N. There is also the increased complexity of combining these sub-arrays so that proper design effort is required to bound the diminishing return.

Figure 3:
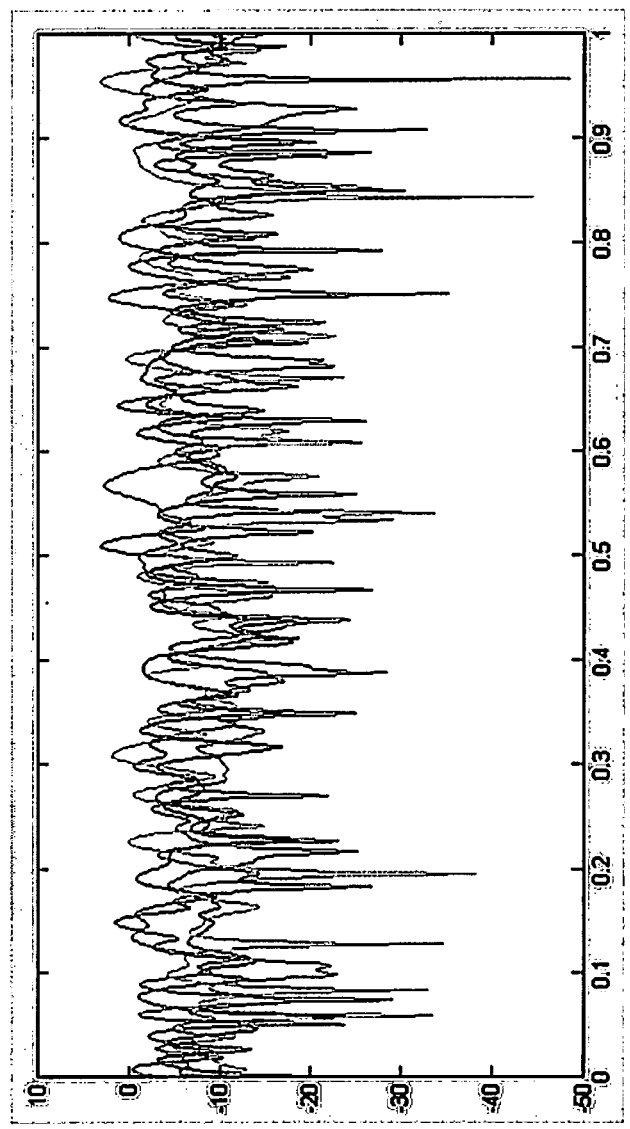
FIG. 3 is a graph illustrating how reflective fading varies over great levels, very rapidly, at any range as shown by way of example for four independent channels over a one second interval.

FIG. 3 illustrates that reflective fading can vary over great levels, very rapidly, at any range as shown for four independent channels over a one second interval. Each channel can have fading of greater than 30 dB but the probability of all channels fading simultaneously by such a large amount is miniscule. Thus, dividing a single phased array antenna (PAA) into four separate phased array antennas (PAAs) and combining them provides distinct advantages over the prior art, as will be described in detail further below.

The use of a sparse array, sometimes referred to herein as pre-demod coherent combining (PDCC), will be shown to be very effective in combining the phased array antennas (PAA) outputs. A major benefit of combining the separate PAA outputs associated with the respective multiple independently fading phased array antennas (PAA) Channels is the elimination of channel fading by combining multiple channels with independent fading because of inter-array spacing greater than the carrier wavelength, i.e., lamda ($\lambda$).

Figure 4:
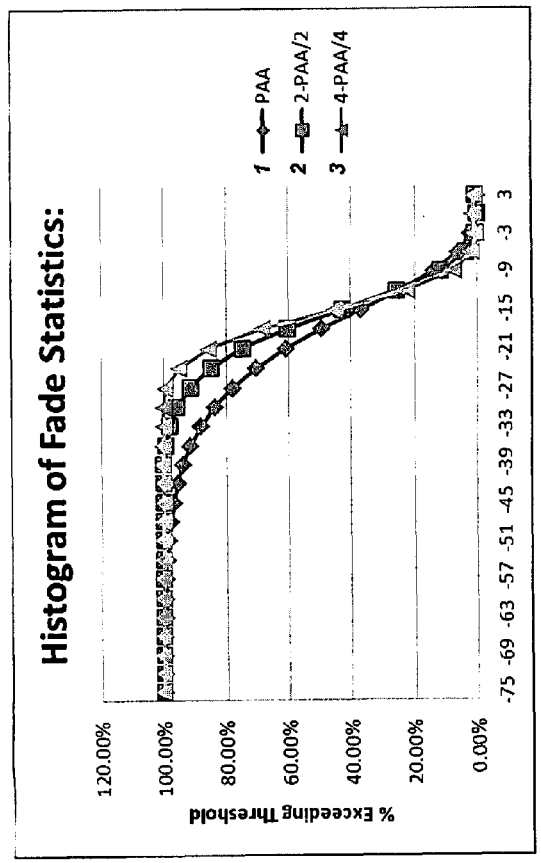
FIG. 4 is a histogram of statistical fading loss highlighting a significant improvement of channel reliability due to combining multiple independently fading phased array antenna (PAA) channels while keeping the total number of elements constant FIG. 5 expands a small region of FIG. 4 to show the gain in fade margin for various allowable outages.

FIG. 4 is a histogram of statistical fading loss showing a significant improvement of channel reliability due to combining multiple independently fading phased array antennas (PAA) channels while keeping the total number of elements constant. In other words, FIG. 4 illustrates a benefit of breaking a single large receive array into multiple arrays with independent fading channels, in accordance with invention principles. The first curve shows a single large array by itself. The second curve splits the single large array into two separate sub-arrays separated sufficiently in phase center location to yield independent fading. The third curve shows these two smaller arrays split again into a total of four sub-arrays, then combining the outputs of all four sub-arrays. An advantage of combining a number of independently fading sub channels preserves the best gain performance of the full array but eliminates the probability of deep fades.

Figure 5A:
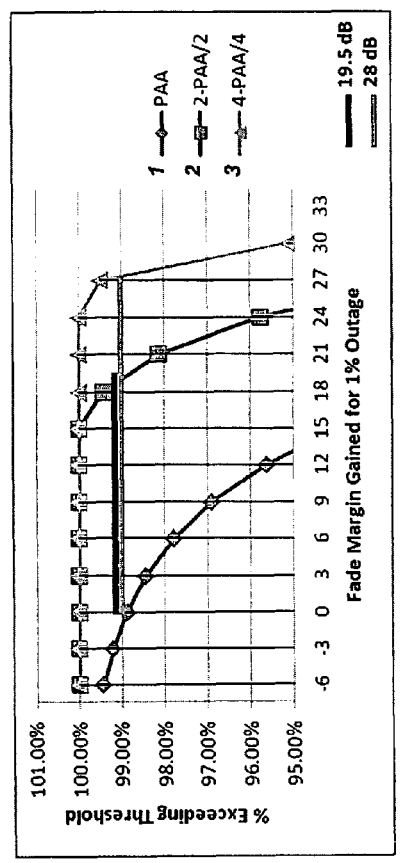
Figure 5B:
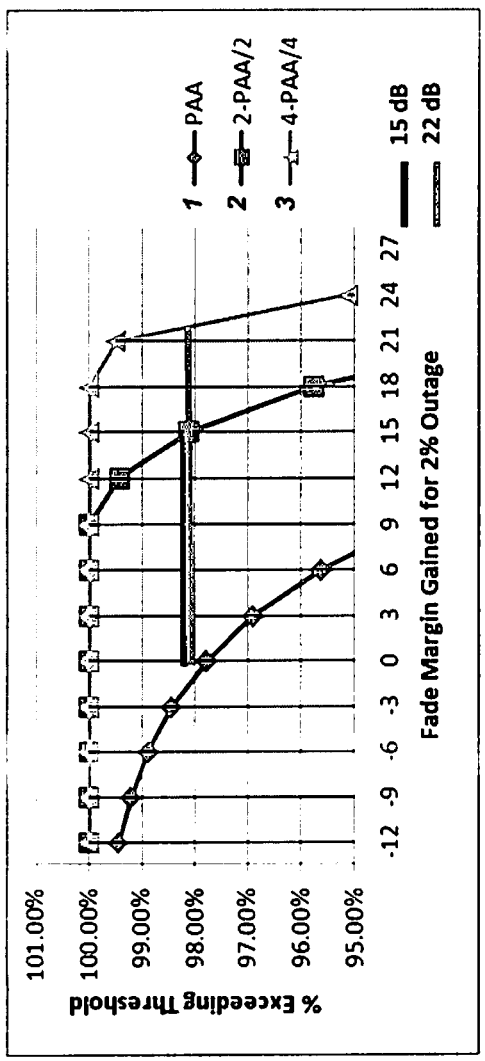
Figure 5C:
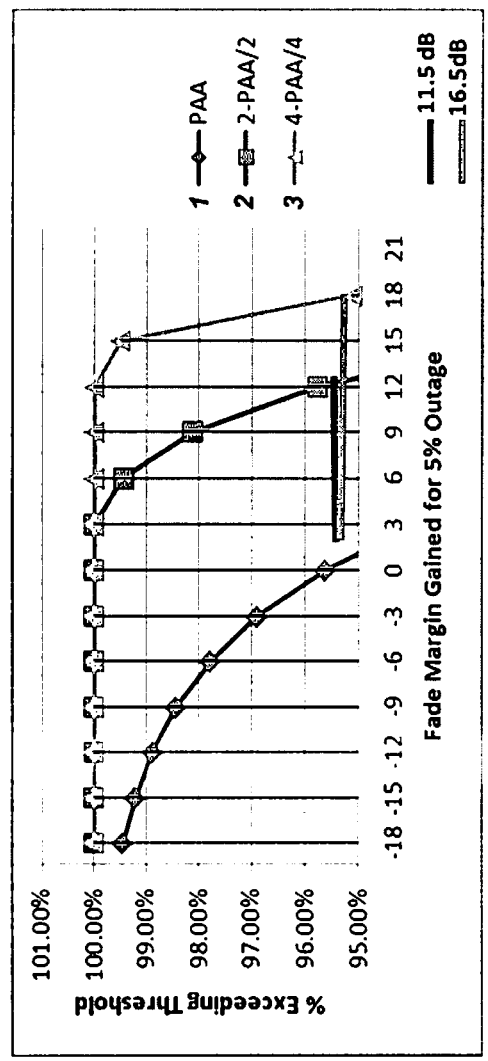

FIGS. 5a-c illustrate the expansion of a particular area of the plot of FIG. 4. The most convenient manner of looking at the curves is to set an outage limit for the desired BER limit. FIG. 5a shows the case of an outage limit of 1% whereby the array is split into two sub-arrays spaced for independent fading yielding an improved fading margin of approximately 8.5 dB. Splitting the two sub-arrays into four sub-arrays yields a fading margin of approximately 11 dB. The further gain of 2.5 dB is realized because it is less likely that all sub-arrays will be simultaneously suffering a deep fade when there are four or more sub-arrays simultaneously operating. Similarly, setting outage limits of 2% and 5% and evaluating the potential benefit are shown in FIGS. 5b and 5c, respectively.

Figure 6A:
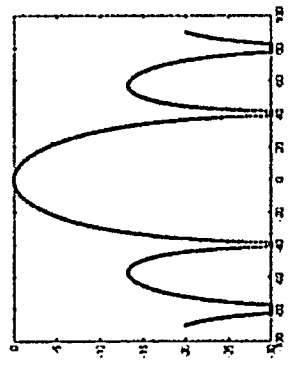
FIG. 6 illustrates the antenna pattern of an antenna element such as a dish or sub array steered toward the desired signal and the lobing effect when summing two such elements spaced at 10 wavelengths apart.
Figure 6B:
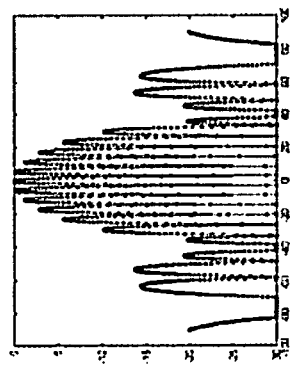
Figure 6C:
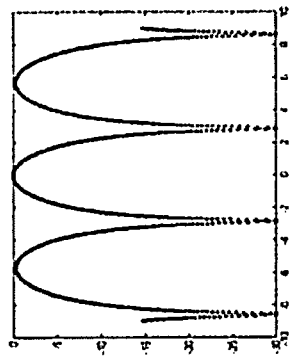

While beam-steering does not require the precision control of nulling a signal, it must be recognized that the wide spacing of the sparse array multiplies the sensitivity to weight drift in phase so that slight variations cause rapid slides from the peak of the beam. The adaptive process used to control the weights must thus have a time constant fast enough to track the platform motion induced upon the array and the fading of the transmission path. It is easy to assume that the use of broad shaped-beam inputs from the Phase Array Antenna (PAA), for example having a null to null beam-width of 80 degrees and a 3 dB beam-width of 40 degrees, as shown in FIG. 6a, or the processing at an IF reduces this sensitivity. However, that is not the case. The spatial modulation due to the wide spacing becomes a multiplier overlay of the PAA beam and the weights, although applied at IF, are reflected in the spatial pattern at the higher RF frequency. At a PAA vertical spacing of 10$\lambda$, 3-dB beam-width will be ~3.5°, as shown in FIGS. 6b and 6c. The approximate elevation beam-width is assumed to be broad, however, as shown in FIG. 6a wide spacing of PAAs generates a lobing effect overlay, as shown in FIGS. 6b and 6c, which drives the tracking requirement.

As the process is summing, the amplitude and phase weighting have minimal impact on the pointing direction when operating near the peak of the beam but the relative phase modulation between the phased-array antenna (PAA) outputs will have severe impact and would cause the effective point direction to skew rapidly when drifted down the peak and operating at near the −3 dB point if not constantly adjusted to maintain peak steering by the adaptive processor. Since the weighting is implemented digitally in an I/Q relationship, the amplitude is integrated with the phase and both I & Q weighting will have to respond rapidly to track the dynamics in parallel.

Although adaptive array work in recent years has focused upon adaptive nulling, most of the architectures and algorithms developed for nulling are also applicable to power enhancement by simply flipping a sign in the mathematics of the algorithm process. The error signal for nulling is much more responsive to error than for beam-forming and the error signal needs to be considered when estimating tracking error. The beam-steering error signal only grows rapidly with phase when beam-steering has drilled beyond the −3 dB point.

Coherent combining is generally considered a beam-forming function. The error signal is thus the error in gain loss from a desired pointing direction which is very small until the pointing error grows great, which, in a highly dynamic fading environment may leave the beam-forming tracker playing catch-up, always operating further down the main beam lobe than desired.

Figure 7:
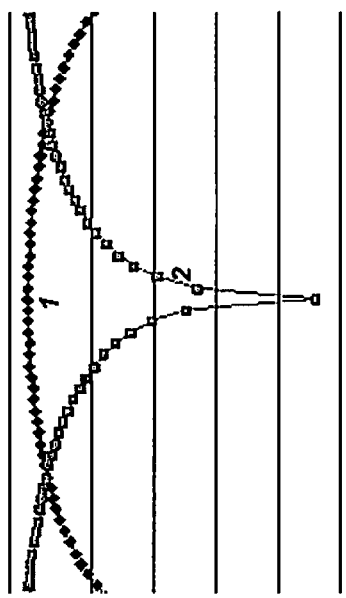
FIG. 7 compares the error functions relative to beam-steering and null steering.
Figure 8:
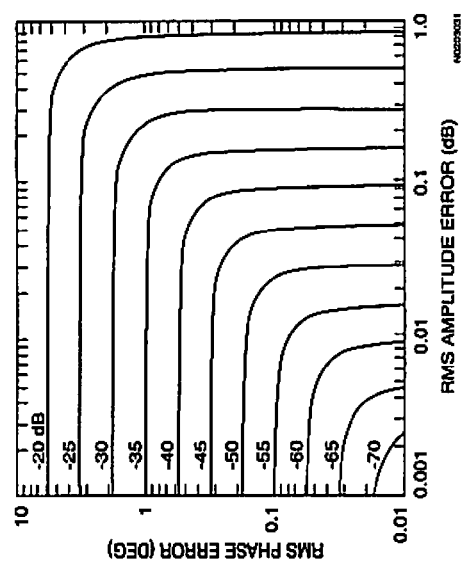
FIG. 8 shows the sensitivity of the null steering error function to both phase and amplitude error.

In beam-forming combining of equal powered signals, a 90 degree relative phase error is required to cause a 3 dB degradation so the phase error signal is very small. In nulling, a null depth of 35 dB degrades by 6 dB with a 1 degree phase error yielding much more sensitive control through error signal feedback. If a nulling function error signal could be used to control the tracking of a beam-steering operation, the combining would operate very close to the peak and never drift far afield. FIG. 7 illustrates the relative beam-steering and null steering error functions. FIG. 8 illustrates the sensitivity of the nulling error function to either phase or amplitude errors.

A two element adaptive array can be structured as either a sidelobe canceller or a fully adaptive array. In nulling, as a sidelobe canceller, one element is assigned the role of main beam and the other element is assigned the role of auxiliary beam. The auxiliary weight is adjusted to be equal in amplitude and phase relative to the main path such that when they are subtracted, they cancel. If these two signals, i.e., the main and weighted auxiliary were instead summed, they would add coherently and yield a 3 dB gain. If only the resulting phase weight were applied to the auxiliary signal but it were allowed its maximum amplitude, the resulting output would track the maximum of either signal and up to 3 dB higher. Since the two elements are far enough apart to have independent fading, fading losses are reduced.

Figure 9:
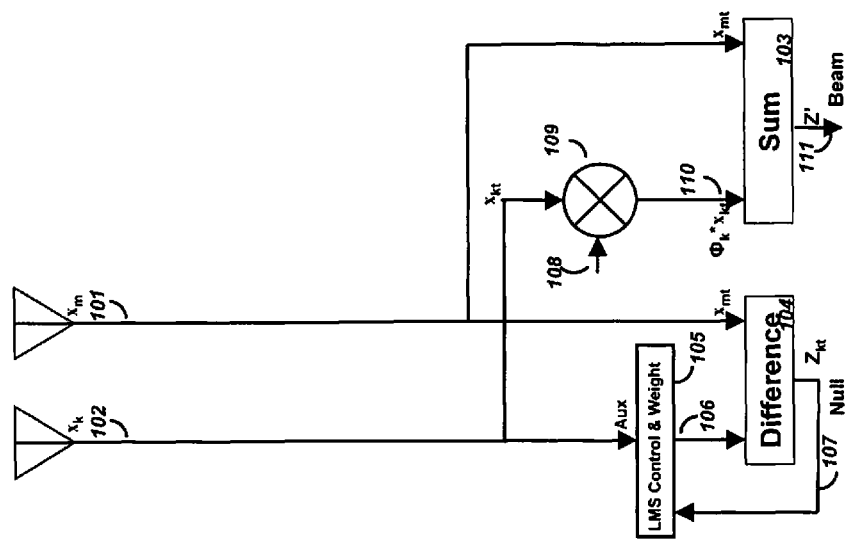
FIG. 9 illustrates a nulling process for driving the beam-steering function.

FIG. 9 illustrates such a system of using a pair of elements with weight formation in a nulling process for tighter tracking and faster response and then deriving the beam-steering weights from the nulling weights. In FIG. 9 two signals from two antennas with independent fading channels are received. One signal is designate the main received signal, $x_m$, 101, or sometimes called the reference signal. The second signal is designated an auxiliary signal, $x_k$, 102. The main received signal is fed to one port of both a summing junction 103 and a difference junction 104. The auxiliary received signal 102 is fed to an adaptive weight controller, in this case shown as a Least Mean Square (LMS) adaptive control and weight 105 where it is weighted and fed out as weighted signal $W_k^* x_k$ 106 and feeds into the difference combiner 104 where it is summed with the main received signal, $x_m$, 101 to form the error signal 107 which is fed back to the LMS control and weight 105 where it is correlated with the incoming auxiliary signal, $x_k$, 102 to calculate a weight $W_k$ that would reduce the error signal 108 to form a null on the received signal. In parallel, the main received signal, $x_m$, 101 feeds the summing junction 103 and the auxiliary received signal, $x_k$, 102 where it is multiplied by the phase of weight $W_k$ 108 in complex weight 109 to form weighted signal 110, summed in summing junction 103 with main received signal 101 to form a beam formed signal Z' 111.

The nulling weight could be used directly for the summation but it has several drawbacks. If the main signal happens to be less than the auxiliary signal, the auxiliary signal will be attenuated, even though it could have a higher S/N by itself without the addition of the main signal. The system is always going to have a preamplifier and probably an AGC in each received signal path. If the preamplifiers have the same gain and the AGCs are slaved together to yield the same gain, the optimum S/N is formed if all elements are weighed magnitude=1 going into the summation junction. Thus the phase of the nulling weight needs to be extracted and applied to the summing junction auxiliary weight. If the adaptive processor for the coherent combiner is implemented in digital processing, it is easy to calculate a weight of maximum magnitude having a phase of a complex weight with a limited amplitude as follows for complex weight, $w_i$:

Effective Channel Gain $\text{Gain} = 1/(\max[(\text{Real}(w_i), \text{Imaginary}(w_i)])$ Summation weight for auxiliary i $W_{Si} = \text{Gain} * w_i$ If the channel has independent AGC gain capability, it needs to be considered in the calculation or additional thermal noise resulting from AGC gain can degrade S/N.

$\text{Gain} = 1/([AGC_{Gi}/AGC_{Gm}] * \max[(\text{Real}(w_i), \text{Imaginary}(w_i)]); \text{effective channel gain}$ $W_{Si} = \text{Gain} * w_i;$ Summation weight for auxiliary i A two element coherent combiner of faded signals can thus be implemented with an error control signal derived from nulling but then used for beam-forming by simply using the phase of the nulling weight and changing the combining from a difference operation to a summing operation.

Figure 10:
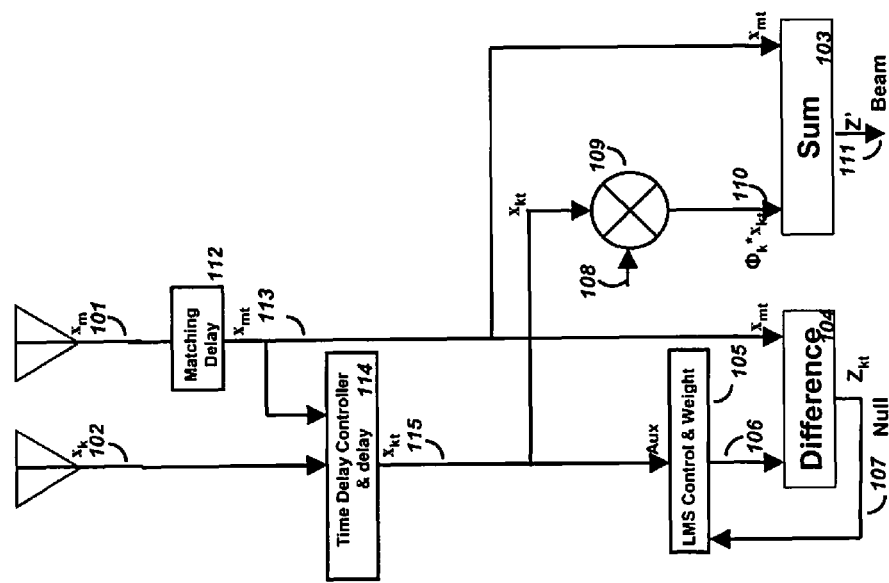
FIG. 10 illustrates the use of a matching time delay function to make the system broadband in a number of antenna configurations and signal scenarios.

Discussion to this point has assumed time delay match on the two signal paths. FIG. 10 shows how the system can be modified to provide for an adaptive time delay matching of the two signal paths. A matching delay 112 would be placed in the path of the main received signal 101 to delay it as delayed main received signal 113 which would be processed as the main received signal 101 had been in FIG. 9. The delayed main received signal 113 also is fed to Time Delay controller and delay 114 where it is correlated with auxiliary received signal 102 to control a variable delay line to match the signal of interest delay in the aux path to that of delayed main received signal 113, producing a delayed auxiliary received signal 115 which would be processed as the auxiliary received signal 102 had been in FIG. 9.

Figure 11:
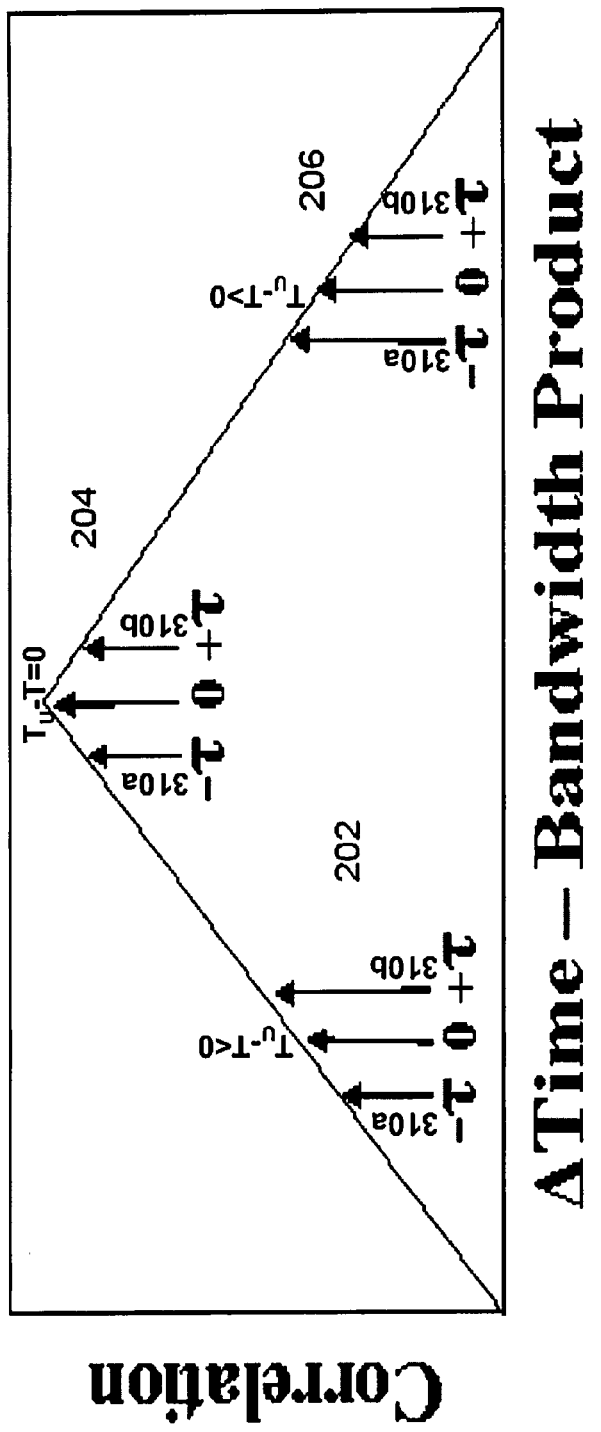
FIG. 11 illustrates the decay of the autocorrelation of a signal with time delay mismatch which will degrade performance if the paths are not appropriately matched.
Figure 12A:
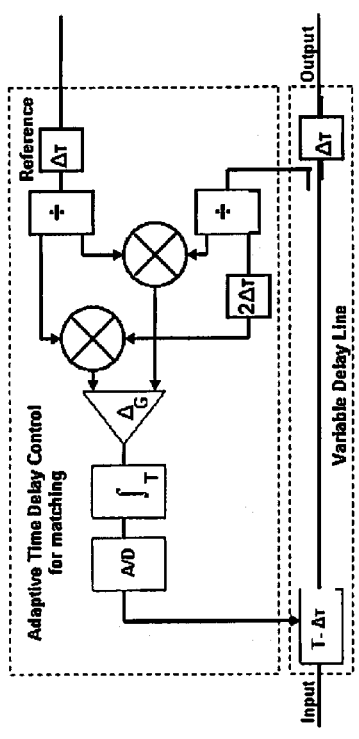
FIG. 12a is a prior art illustration of adaptive time control and a variable delay line that could be used for the time delay matching function.

The function of the time delay controller and delay 114 can be accomplished by the method set forth in U.S. Pat. No. 8,094,764, incorporated by reference herein in its entirety, describing a method for fine tuning the channel match in a system for interference cancellation. It uses a standard auto-correlation function as shown in FIG. 11 to drive the convergence to matching time delay. The block diagram of that control and delay system is shown in FIG. 12a. It is limited to a time delay adjustment range of ±1/BW of the signal of interest, which limits the variability of scenarios in which it can work without manual intervention. FIG. 12 b shows a recent improvement of the architecture, as described more fully in U.S. Pat. No. 8,094,764.

Figure 13:
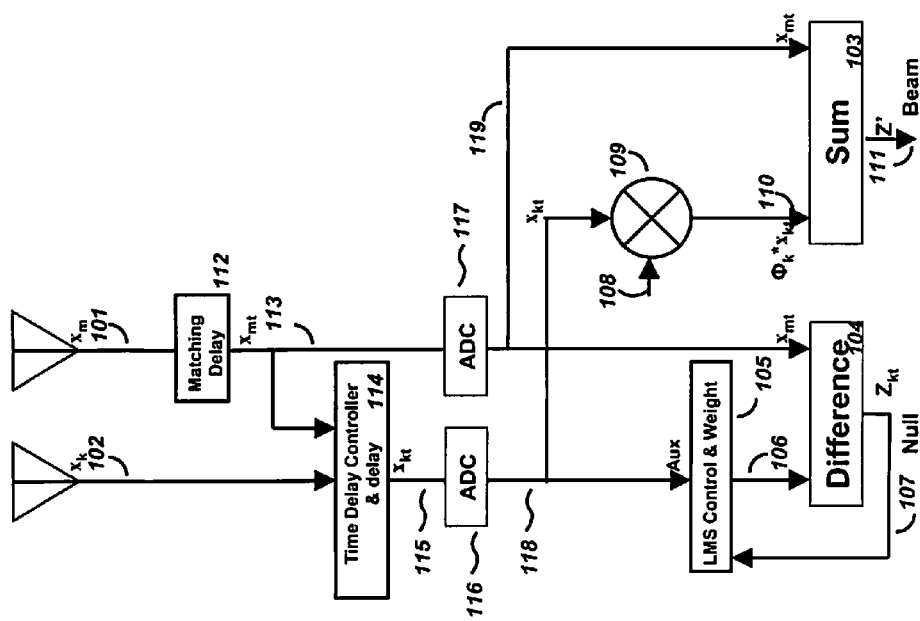
FIG. 13 illustrates a variation of the architecture for implementing the nulling and beam-forming functions in digital processing, according to one embodiment.

This pre-demod coherent combining (PDCC) system, using nulling as the error signal for weight adaptation and then using the phase of this adapted nulling weight for the beam-steering, requires matching between the nulling and summing weights. This is difficult in analog but is easy in digital processing. Thus, the architecture of the system could be modified as shown in FIG. 13 to include A/D conversion after the time delay matching and then all further processing would be done in digital signal processing devices.

Figure 14:
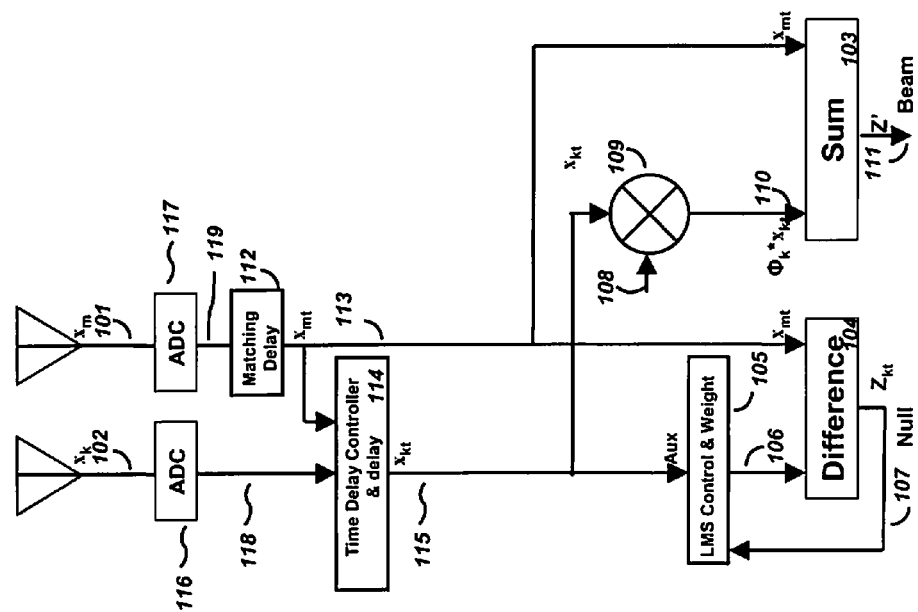
FIG. 14 illustrates a further embodiment for implementing time delay matching in digital processing.

An alternate configuration is shown in FIG. 14 where the A/D conversion is performed at the elements and all processing is performed digitally. This would require the time delay controller and delay 114 function to be performed digitally.

Figure 15:
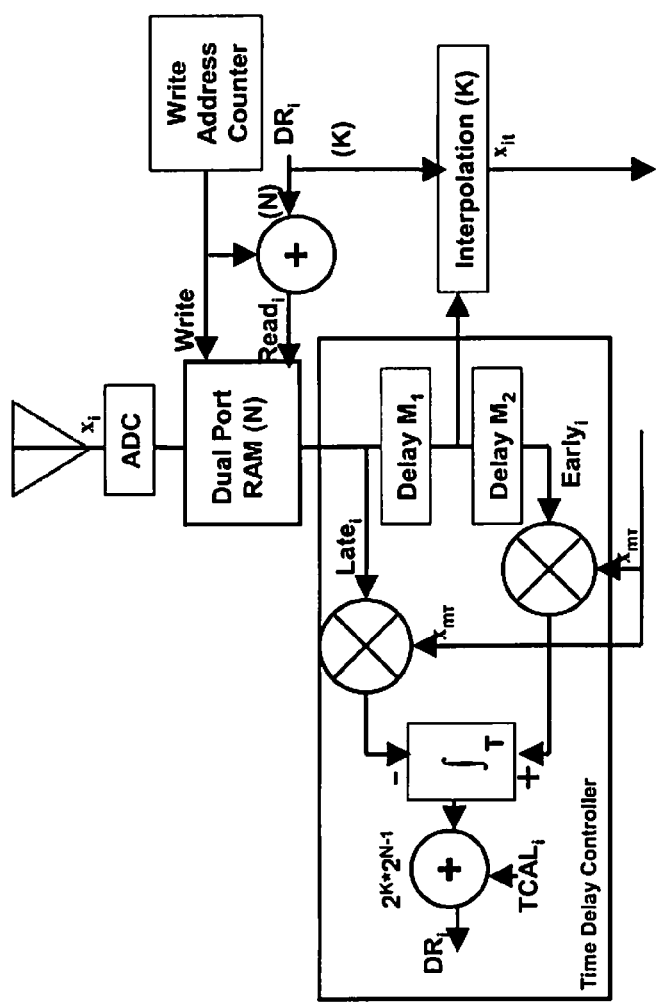
FIG. 15 illustrates a digital implementation of the adaptive time delay control and delay implementation according to the prior art.

FIG. 15 is a block diagram of a digital system that would duplicate the functions shown in FIG. 12a. A similar conversion could be made to the analog processing of FIG. 12b.

Figure 16:
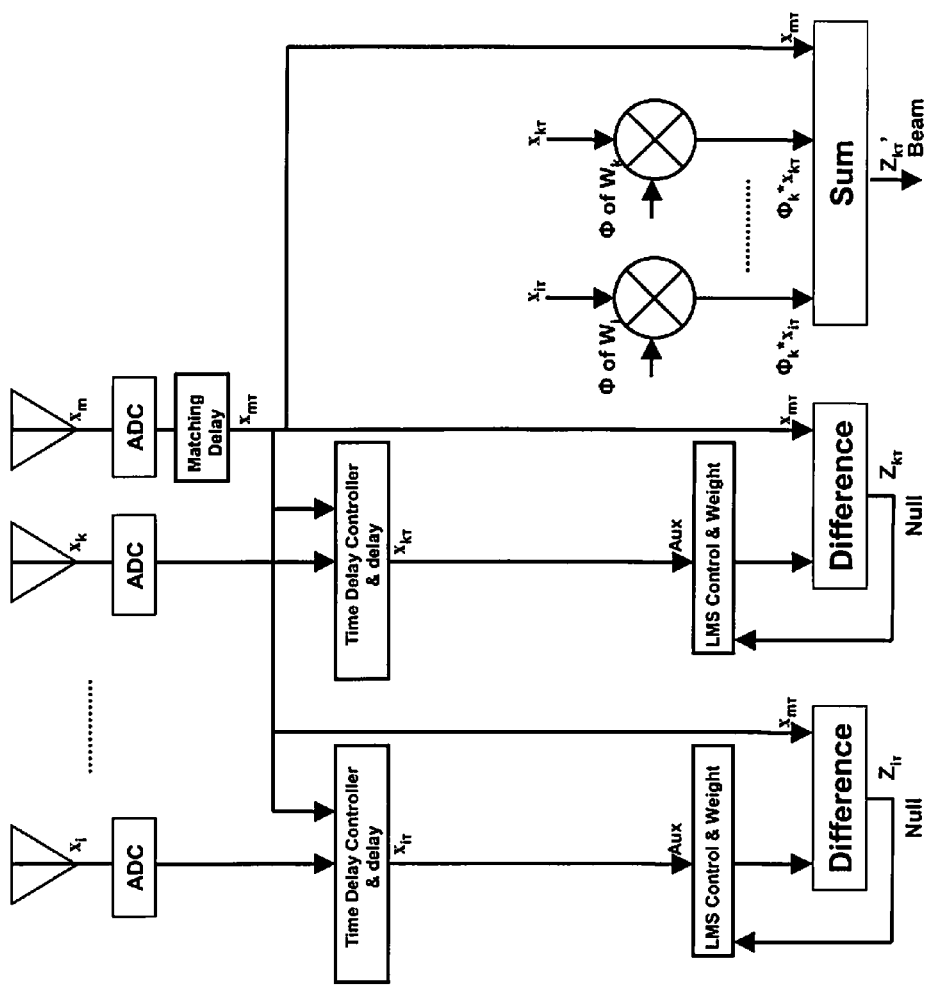
FIG. 16 shows an adaptive communication system that combines three or more antenna elements, according to one embodiment.

The reciprocity of the weights of the auxiliary from a nulling process providing a perfect beam-steering weight by a sign flip is only true of a two-element array. In a system of two or more auxiliary elements, all elements work together to match the main for nulling so that when the sign is flipped, a beam occurs but it may not be the optimum beam. If the nulling is processed individually for each auxiliary, as shown in FIG. 16, then the optimum beam would be formed when the sign is changed for beam-steering.

If one element is selected as the main element, it is not immune from channel fading. It can thus degrade to essentially thermal noise, the adaptive nulling would stop, and the beam-steering would disintegrate.

Figure 17:
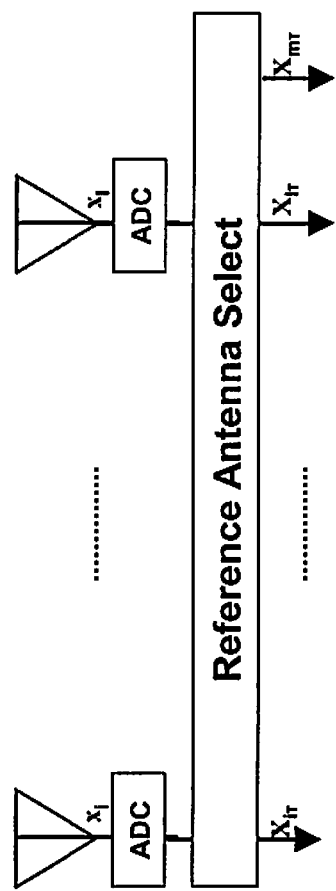
FIG. 17 illustrates how a main, or reference, element could be dynamically selected from a group of elements based upon some signal processing advantage.
Figure 18:
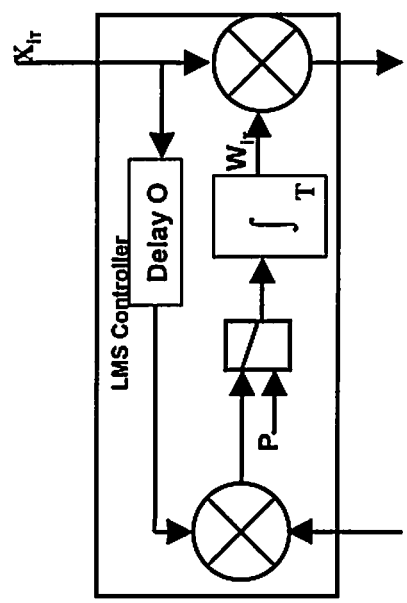
FIG. 18 shows a form of an adaptive controller that would allow the element to be used as the main or auxiliary element.

FIG. 17 shows the addition of a Reference Antenna Select block after the element A/D converters. The output of the strongest element input could be selected as the temporary main element. A filter could be included to prevent high rate toggling of antenna selection. This would assure that the beam-forming was consistently tracking a non-faded signal. The switching would mess up the beam if effective weights of the elements were suddenly changed in the existing architecture but if all elements were still fed out to their respective adaptive control blocks and the selected main received signal were distributed to them for the adaptive control, the summation could then be continuously going through all elements phase weighted. When a particular element is selected as the main reference, its weight should decay slowly to a magnitude=1, phase=0 weight so that no sharp transition of signal occurs. This could be implemented in an adaptive LMS Controller as shown in FIG. 18. Under normal operation as an auxiliary element, the loop weight integration would be driven by the correlator output. When this element is selected as the main, a pilot vector would be switched into the integrator to drive the weight to a quiescent weight of magnitude=1, phase=0.

Figure 19:
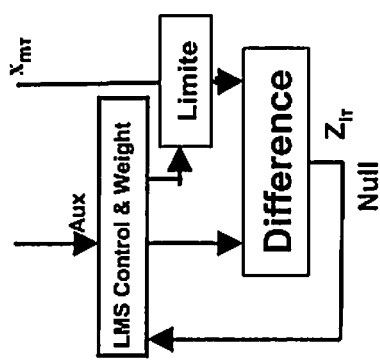
FIG. 19 illustrates how an adaptively controlled limiter could aid the convergence to a null.

Most adaptive control algorithms don't like to tune auxiliary weight above magnitude 1. Since the desire is to use a strong signal for the main signal, the auxiliaries would not be able to null the main on their own and thus have more drift around the optimum phase. Two prior art methods have been used in adaptive nulling systems is to either add gain in the auxiliary path to provide for the maximum delta dynamic range or to add a limiter, as shown in FIG. 19, in the main path to the difference junction with a control signal derived from the magnitude of the developing weight.

FIGS. 20a-b illustrate alternate configurations for arrays of greater than 3 elements. By way of example only, three different architectures showing expansion from a two-element system to a four element are shown. FIG. 20a shows a first architecture having direct expansion with a common building block. Elements are pairwise combined, the outputs are combined in a common process, and repeated until a single output results. FIG. 20b illustrates a second architecture showing an expansion using a common auxiliary building block and a different Main element building block but all elements synchronized to the single main element. FIG. 20c shows a third architecture illustrating a reference antenna selection block such as the one shown in FIG. 17 that would pick out a strong signal to use for tracking by all auxiliary elements.

Figure 21:
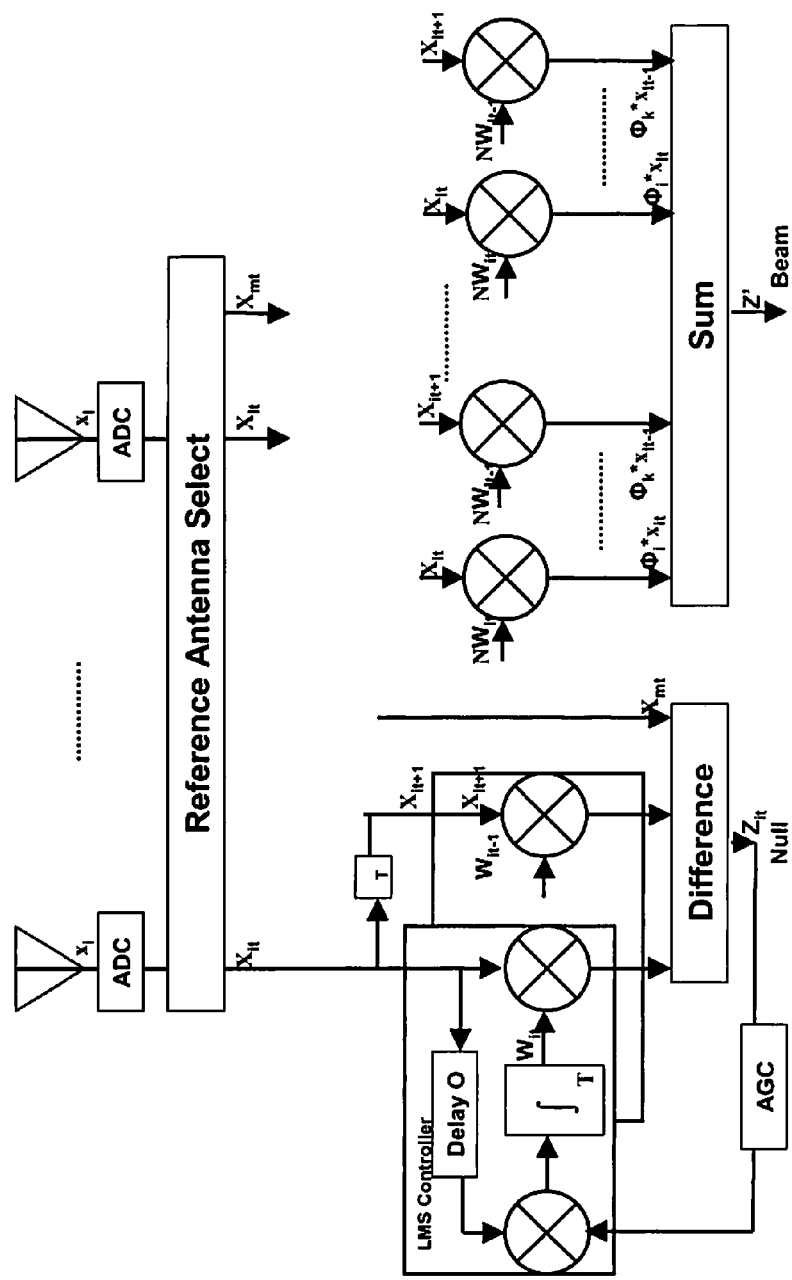
FIG. 21 illustrates how a tapped delay line on the element data streams could be used to improve performance by implementing an adaptive equalizer for the nulling that would then be turned into an adaptive equalizer on the beam-forming.

FIG. 21 illustrates how a tapped delay line on the element data streams could be used to improve performance by implementing an adaptive equalizer for the nulling that would then be turned into an adaptive equalizer on the beam-forming. The number of taps can be expanded. This facilitates interpolation between digital samples of the signals and could be sufficient for the time delay adjustment in some systems. The weight calculation is more complex. The individual phases of the individual weights cannot be used because the multiple taps are essentially providing increased gain and thus potential thermal noise. An amplitude derived from the sum of the magnitudes of all the weighted taps for the element must be used. The sum of the magnitudes of the tap weights is calculated and then the summing tap weight will be equal to the difference tap weight divided by the sum of the magnitudes.

There are many distinctions between different classes of adaptive antenna algorithms and architectures. The LMS algorithm was used as an example above but any adaptive nulling algorithm will work as the nulling controller as long as it is fast enough to track the dynamics of the scenario. The space-time adaptive processor (STAP) architecture is typically used in tapped delay systems.

Time Delay Control

Accurate time delay matching is a major requirement for wideband phased arrays. Such systems are often enclosed in climate controlled housings to maintain accurate temperatures of the cables to prevent drill due to thermal expansion and restrict the off-boresight scanning to limit the range of de-correlation. Since nulling broadband signals is the more difficult problem, requiring more precision, adaptive time delay control methodologies were originally developed for nulling applications.

FIG. 12a is a prior art illustration taken from U.S. Pat. No. 8,094,764. FIG. 12a illustrates a system with a capability of adjusting a time delay very precisely over a time interval of ±1/BW.

Figure 12B:
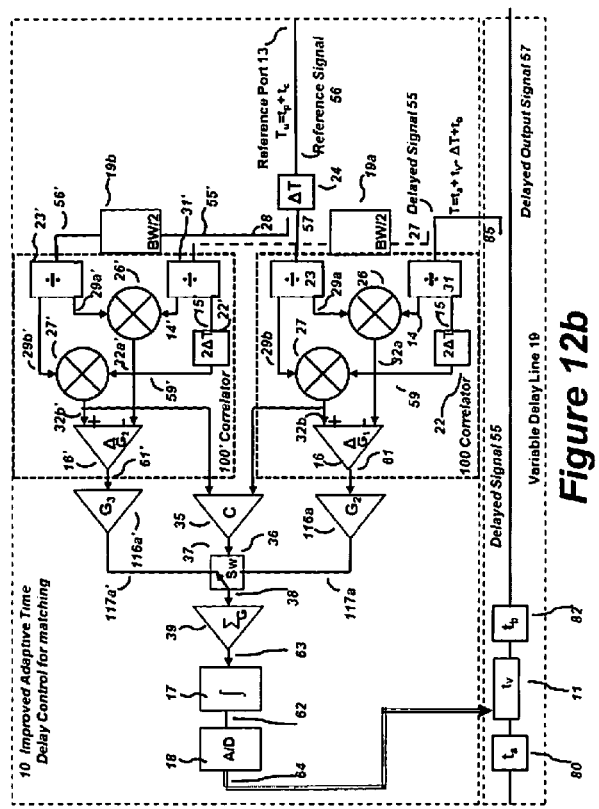

FIG. 12b illustrates an improvement over the system illustrated in FIG. 12a in that it provides a greater range of time mismatch adjustment in a uniform rate with high convergence precision. More particularly, FIG. 12b illustrates the architecture of the improved adaptive time delay matching control loop for wideband adaptive nulling. Both use the general de-correlation function of time and bandwidth shown in FIG. 11 to drive the adaptive time matching. The span of time over which it can adjust and the speed of adapting to lock on and track a signal are adjustable by system design parameter selection. In one embodiment, the architecture of an adaptive time delay matching control loop for wideband adaptive nulling, as shown in FIG. 12b may be used in the case where the system needs large spans of adjustable time delay. In a preferred embodiment, small delay matching is all that is required and may be implemented in a simple tapped delay line structure.

Another method of adjusting time that has even greater range of adjustment is to include a receiver demodulator process as a parallel processing on each phased array antenna (PAA). The receivers demodulate the signal and can use the demodulated data stream to synchronize by controlling digital delay following the A/D converters to get close and then an adaptive control loop to control the sample time relative to the epoch of the spread spectrum signal.

Figure 22:
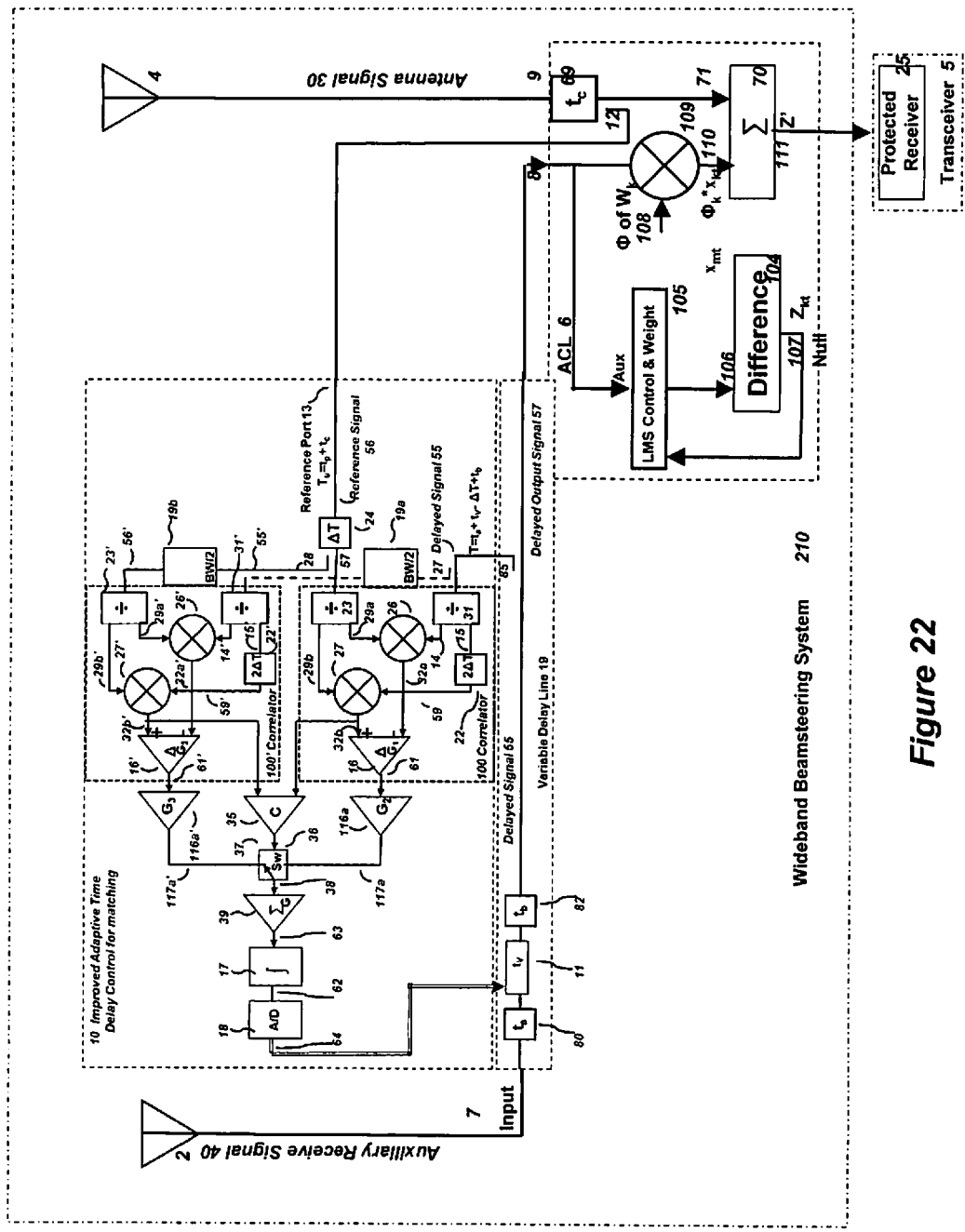
FIG. 22 illustrates an application of the Adaptive Control Loop beam-forming system of FIG. 14 in a wideband beam-forming system for coherently summing a common transmitted signal arriving at two independent elements, according to one embodiment.

FIG. 22 illustrates an application of the Adaptive Control Loop beam-forming system of FIG. 14 in a wideband beam-forming system for coherently summing a common transmitted signal arriving at two independent elements, according to one embodiment.

The foregoing is to be construed as only being an illustrative embodiment of this disclosure. Persons skilled in the art can easily conceive of alternative arrangements providing functionality similar to this embodiment without any deviation from the fundamental principles or the scope of the disclosure.

What is claimed is:

1. A method for performing coherent beam combining of independently faded signals, the method comprising:
   a) receiving a desired signal at an input of at least two receive elements,
   b) generating an output signal at each of said at least two receive elements responsive to said received input signals,
   c) digitizing each output signal from each receive element into an independent signal stream, wherein each independent signal stream represents a different receive path having independent thermal noise, and
   d) processing the independent signal streams in pairs, comprising:
      selecting one of the first or second signal streams of the signal stream pair for identification as a reference signal stream,
      identifying the non-selected signal stream as an auxiliary signal stream,
      dividing the reference signal stream into an off-line reference sub-stream and an in-line reference sub-stream,
      dividing the auxiliary signal stream into an off-line auxiliary sub-stream and an in-line auxiliary sub-stream,
      processing the off-line reference sub-stream and off-line auxiliary sub-stream in an adaptive process to calculate a weighting value for the off-line auxiliary sub-stream that forms a null in a combined spatial pattern of the off-line auxiliary sub-stream and the off-line reference sub-stream when subtracted from the off-line reference signal sub-stream,
      weighting the in-line auxiliary sub-stream using the phase of said calculated weighting value to form a weighted in-line auxiliary sub-stream, summing the in-line reference sub-stream and the weighted in-line auxiliary sub-stream in a correlated manner to form a beam-formed signal stream, and tracking a desired signal using the beam-formed signal stream as the desired signal changes in relative angle of arrival at the input of said at least two receive elements by continuously tracking the null and applying resultant weights in a beam-forming system.

2. The method of claim 1, further comprising:

e) repeating said processing step (d) for all pairwise groupings of independent signal streams to form a plurality of beam-formed signal streams, f) pairwise processing the plurality of beam-formed signal streams for all of said pairwise groupings at said repeating step (e) in accordance with said processing step (d), g) repeating step (f) until only one output remains, representing the coherent summation of all elements.

3. The method of claim 1, where all of the at least two receive elements are fixed in pointing direction.

4. The method of claim 1, where the at least two receive elements are mechanically or electronically steered to track a moving node of the data link.

5. The method of claim 1, where the at least two receive elements have inherent directionality and gain.

6. The method of claim 1, where the at least two receive elements have no distinctive directionality or gain.

7. The method of claim 1, where the at least two receive elements are composed of an array of elements.

8. The method of claim 1, where the at least two receive elements are constrained to a two dimensional face.

9. The method of claim 1, where the at least two receive elements have a three dimensional mounting.

10. The method of claim 1, where the signal streams are analog streams processed using matched, high precision analog components.

11. The method of claim 1, where the adaptive array nulling algorithm is a closed-loop system requiring feedback.

12. The method of claim 1, where the adaptive array nulling algorithm is an open-loop system not requiring feedback.

13. The method of claim 1, where the adaptive array nulling algorithm weights used in the in-line application uses phase-only information from the nulling process.

14. The method of claim 1, where the adaptive array nulling algorithm weights used in the in-line application uses phase and amplitude information from the nulling process.

15. The method of claim 1, where the weight implementation uses in-phase and quadrature separation to perform the phase modulation.

* * * * *